US007216014B2

(12) United States Patent
Iwai

(10) Patent No.: US 7,216,014 B2
(45) Date of Patent: May 8, 2007

(54) PAPER MONEY DISCRIMINATING DEVICE

(75) Inventor: Koji Iwai, Sawa-gun (JP)

(73) Assignee: Sanden Corporation, Isesaki, Gunma (JP)

( * ) Notice: Subject to any disclaimer, the term of this patent is extended or adjusted under 35 U.S.C. 154(b) by 412 days.

(21) Appl. No.: 10/849,790

(22) Filed: May 21, 2004

(65) Prior Publication Data

US 2004/0231954 A1 Nov. 25, 2004

(30) Foreign Application Priority Data

May 22, 2003 (JP) ............................ 2003-145234

(51) Int. Cl.
*G06F 17/00* (2006.01)

(52) U.S. Cl. ...................................... 700/244; 700/213

(58) Field of Classification Search ................ 700/213, 700/244; 235/380
See application file for complete search history.

(56) References Cited

U.S. PATENT DOCUMENTS 4,720,092 A * 1/1988 Juleff ......................... 271/207
4,807,736 A * 2/1989 Kondo et al. ............... 194/206
4,834,230 A * 5/1989 Kondo et al. ............... 194/206
4,854,247 A * 8/1989 Sciortino et al. ........... 109/1 R
5,195,739 A * 3/1993 Watabe ....................... 271/207
5,632,367 A 5/1997 Bergeron et al.
5,653,436 A * 8/1997 Zouzoulas .................. 271/177
5,964,336 A * 10/1999 Itako et al. ................. 194/207
5,988,345 A 11/1999 Bergeron et al.
6,213,277 B1 * 4/2001 Blad et al. .................. 194/350
6,375,185 B1 * 4/2002 Lin ............................ 271/177
6,540,225 B2 * 4/2003 Iwai et al. .................. 271/213
6,755,414 B2 * 6/2004 Iwai et al. .................. 271/176
2004/0149537 A1 * 8/2004 Pai ............................ 194/203

* cited by examiner

*Primary Examiner*—Khoi H. Tran
(74) *Attorney, Agent, or Firm*—Banner & Witcoff, Ltd.

(57) ABSTRACT

The invention provides a paper money discriminating device which is simplified in structure and can be manufactured less expensively and therefore can contribute to cost reduction and productivity improvement. Thus, a first detecting member and a second detecting member are released from contact with each other, the second detecting member performs a prescribed action and the action of the second detecting member is detected by a detector when a paper money accommodating unit is taken off a discriminating device body, when an openable member is opened, or when paper money accommodated in the paper money accommodating unit has reached or surpassed a prescribed quantity, a state in which the paper money accommodating unit is taken off, a state in which the openable member is opened and a state in which paper money accommodated in the paper money accommodating unit has reached or surpassed the prescribed quantity can be detected by a single detector.

15 Claims, 13 Drawing Sheets

PAPER MONEY DISCRIMINATING DEVICE

BACKGROUND OF THE INVENTION

1. Field of the Invention

The present invention relates to a paper money discriminating device for use in vending machines and the like which accept paper money.

2. Description of the Related Art

Known conventional paper money discriminating devices of this kind include one comprising a discriminating unit for discriminating paper money put into a paper money inlet, a carrying mechanism for carrying discriminated paper money to a prescribed position in a discriminating device body, a pushing mechanism for pushing the paper money carried to the prescribed position in a prescribed direction, and a paper money accommodating unit for accepting the paper money pushed by the pushing mechanism, equipped with an openable cover for opening and closing a paper money outlet, is detachably installed on the discriminating device body (see for instance the specification of the U.S. Pat. No. 5,756,985).

This kind of paper money discriminating device is provided with a first detector for detecting the state in which the paper money accommodating unit is not fitted to the discriminating device body, a second detector for detecting the open state of the openable cover, and a third detector for detecting the state in which the paper money accommodating unit has reached a prescribed loaded level (see for instance the specification of the U.S. Pat. No. 5,988,345), and when any of these detectors detects any of the states referred to above, a prescribed detection signal is issued.

The pushing mechanism consists of a pushing plate for pushing paper money and a drive mechanism for moving the pushing plate in the direction of pushing paper money, and the pushing plate is moved while being kept parallel to the direction of pushing paper money by engaging a sliding member, which is engaged with rails laid in the discriminating device body, with a slit bored in the pushing plate. A known example of the pushing mechanism is a pantagraph type one, which moves the pushing plate with a pair of mutually crossing links (see for instance the specification of the U.S. Pat. No. 5,632,367).

However, as this paper money discriminating device requires three detectors for detecting the unfitted state of the paper money accommodating unit and other states, it is complex in structure, requires many constituent parts, and accordingly invites an increase in cost and a decrease in productivity. Those using a sliding member or a pantagraph mechanism for its pushing mechanism also involve the problems of complex structure and a large number of constituent parts as described above.

SUMMARY OF THE INVENTION

An object of the present invention, attempted in view of the problems noted above, is to provide a paper money discriminating device which is simple in structure, can be manufactured inexpensively and therefore can contribute to cost reduction and productivity improvement.

In order to achieve the object stated above, a paper money discriminating device according to the invention comprises a discriminating unit for discriminating paper money put in through a paper money inlet, a carrying mechanism for carrying discriminated paper money to a prescribed position within a discriminating device body, and a paper money accommodating unit for accommodating the paper money carried to the prescribed position, wherein the paper money accommodating unit is disposed detachably from the discriminating device body and the paper money accommodating unit is provided with an openable member for opening and closing a paper money outlet, further provided with: a first detecting member disposed toward the paper money accommodating unit to be opposite a prescribed position on the discriminating device body side and arranged integrated with the openable member, a second detecting member provided in a prescribed position on the discriminating device body side, which comes into contact with the first detecting member when the paper money accommodating unit is fitted to the discriminating device body and the openable member is in a closed state, is released from the contact with the first detecting member and performs a prescribed action when the paper money accommodating unit is taken off the discriminating device body or when the openable member is opened, and a detector for detecting the action of the second detecting member.

Since in this configuration the first detecting member and the second detecting member are released from contact with each other, the second detecting member performs a prescribed action and the action of the second detecting member is detected by the detector when the paper money accommodating unit is taken off the discriminating device body or when the openable member is opened, a state in which the paper money accommodating unit is taken off and a state in which the openable member is opened can be detected by a single detector. Therefore, compared with a configuration in which these states are separately detected by a plurality of detectors, the number of constituent elements can be substantially reduced with the result that the device can be simplified in structure and manufactured less expensively and therefore can contribute to cost reduction and productivity improvement.

A paper money discriminating device according to the invention comprising a discriminating unit for discriminating paper money put in through a paper money inlet, a carrying mechanism for carrying discriminated paper money to a prescribed position within a discriminating device body, and a paper money accommodating unit for accommodating the paper money carried to the prescribed position, wherein the paper money accommodating unit is disposed detachably from the discriminating device body and the paper money accommodating unit is provided with an openable member for opening and closing a paper money outlet, may be further provided with a first detecting member disposed toward the paper money accommodating unit to be opposite a prescribed position on the discriminating device body side and shifting in a prescribed direction according to the quantity of paper money accommodated in the paper money accommodating unit, a second detecting member provided in a prescribed position on the discriminating device body side, which comes into contact with the first detecting member when the paper money accommodating unit is fitted to the discriminating device body and paper money accommodated in the paper money accommodating unit is less than a prescribed quantity, is released from the contact with the first detecting member and performs a prescribed action when the paper money accommodating unit is taken off the discriminating device body or when paper money accommodated in the paper money accommodating unit has reached or surpassed the prescribed quantity, and a detector for detecting the action of the second detecting member.

Since in this configuration the first detecting member and the second detecting member are released from contact with each other, the second detecting member performs a prescribed action and the action of the second detecting member is detected by the detector when the paper money accommodating unit is taken off the discriminating device body or when paper money accommodated in the paper money accommodating unit has reached or surpassed the prescribed quantity, a state in which the paper money accommodating unit is taken off and a state in which paper money accommodated in the paper money accommodating unit has reached or surpassed the prescribed quantity can be detected by a single detector. Therefore, compared with a configuration in which these states are separately detected by a plurality of detectors, the number of constituent elements can be substantially reduced with the result that the device can be simplified in structure and manufactured less expensively and therefore can contribute to cost reduction and productivity improvement.

A paper money discriminating device according to the invention comprising a discriminating unit for discriminating paper money put in through a paper money inlet, a carrying mechanism for carrying discriminated paper money to a prescribed position within a discriminating device body, and a paper money accommodating unit for accommodating the paper money carried to the prescribed position, wherein the paper money accommodating unit is disposed detachably from the discriminating device body and the paper money accommodating unit is provided with an openable member for opening and closing a paper money outlet, may be further provided with a first detecting member disposed toward the paper money accommodating unit to be opposite a prescribed position on the discriminating device body side, arranged integrated with the openable member, and shifting in a prescribed direction according to the quantity of paper money accommodated in the paper money accommodating unit, a second detecting member provided in a prescribed position on the discriminating device body side, which comes into contact with the first detecting member when the paper money accommodating unit is fitted to the discriminating device body, the openable member is closed and paper money accommodated in the paper money accommodating unit is less than a prescribed quantity, is released from the contact with the first detecting member and performs a prescribed action when the paper money accommodating unit is taken off the discriminating device body, when the openable member is opened or when paper money accommodated in the paper money accommodating unit has reached or surpassed the prescribed quantity, and a detector for detecting the action of the second detecting member.

Since in this configuration the first detecting member and the second detecting member are released from contact with each other, the second detecting member performs a prescribed action and the action of the second detecting member is detected by the detector when the paper money accommodating unit is taken off the discriminating device body, when the openable member is opened or when paper money accommodated in the paper money accommodating unit has reached or surpassed the prescribed quantity, a state in which the paper money accommodating unit is taken off, and a state in which the openable member is opened and a state in which paper money accommodated in the paper money accommodating unit has reached or surpassed the prescribed quantity can be detected by a single detector. Therefore, compared with a configuration in which these states are separately detected by a plurality of detectors, the number of constituent elements can be substantially reduced with the result that the device can be simplified in structure and manufactured less expensively and therefore can contribute to cost reduction and productivity improvement.

A paper money discriminating device according to the invention may comprise a discriminating unit for discriminating paper money put in through a paper money inlet, a carrying mechanism for carrying discriminated paper money to a prescribed position within a discriminating device body, a pushing mechanism for pushing paper money carried to the prescribed position in a prescribed direction, and a paper money accommodating unit for accepting the paper money pushed by the pushing mechanism, wherein the pushing mechanism comprises a pushing plate for pushing paper money, a drive mechanism for shifting the pushing plate in the direction of pushing paper money, one engaging portion disposed on the pushing plate, and another engaging portion disposed on the discriminating device body side, the engaging portions being engaged with each other to be shiftable in the direction of pushing paper money.

Since in this configuration a sliding mechanism for the pushing plate is composed of only the engaging portion of the pushing plate and the engaging portion on the discriminating device body side, the sliding mechanism requires no other component with the result that the device can be simplified in structure and manufactured less expensively and therefore can contribute to cost reduction and productivity improvement.

DESCRIPTION OF THE PREFERRED EMBODIMENTS

Figure 1:
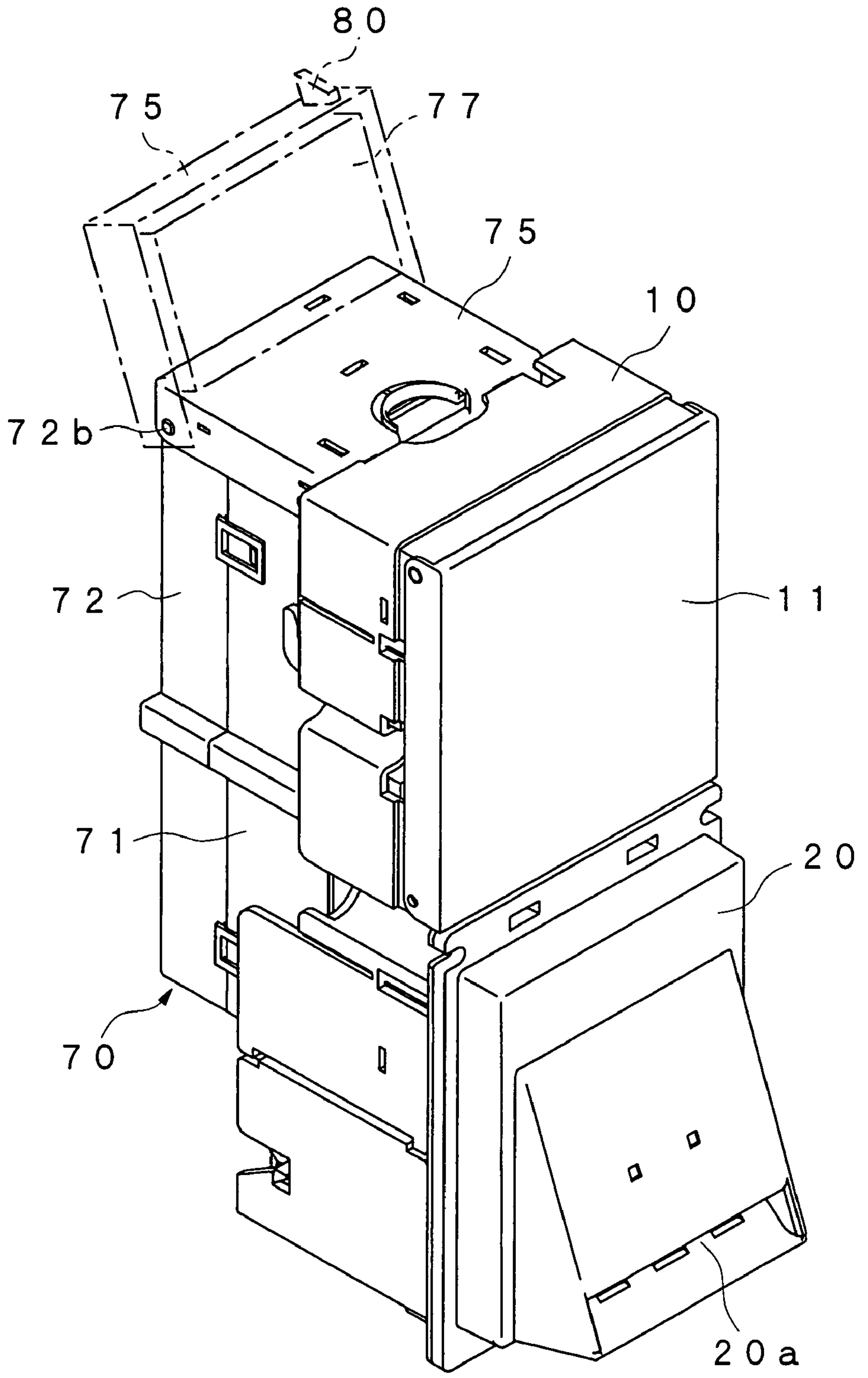
FIG. 1 shows a perspective view of a paper money discriminating device, which is a preferred embodiment of the present invention.
Figure 2:
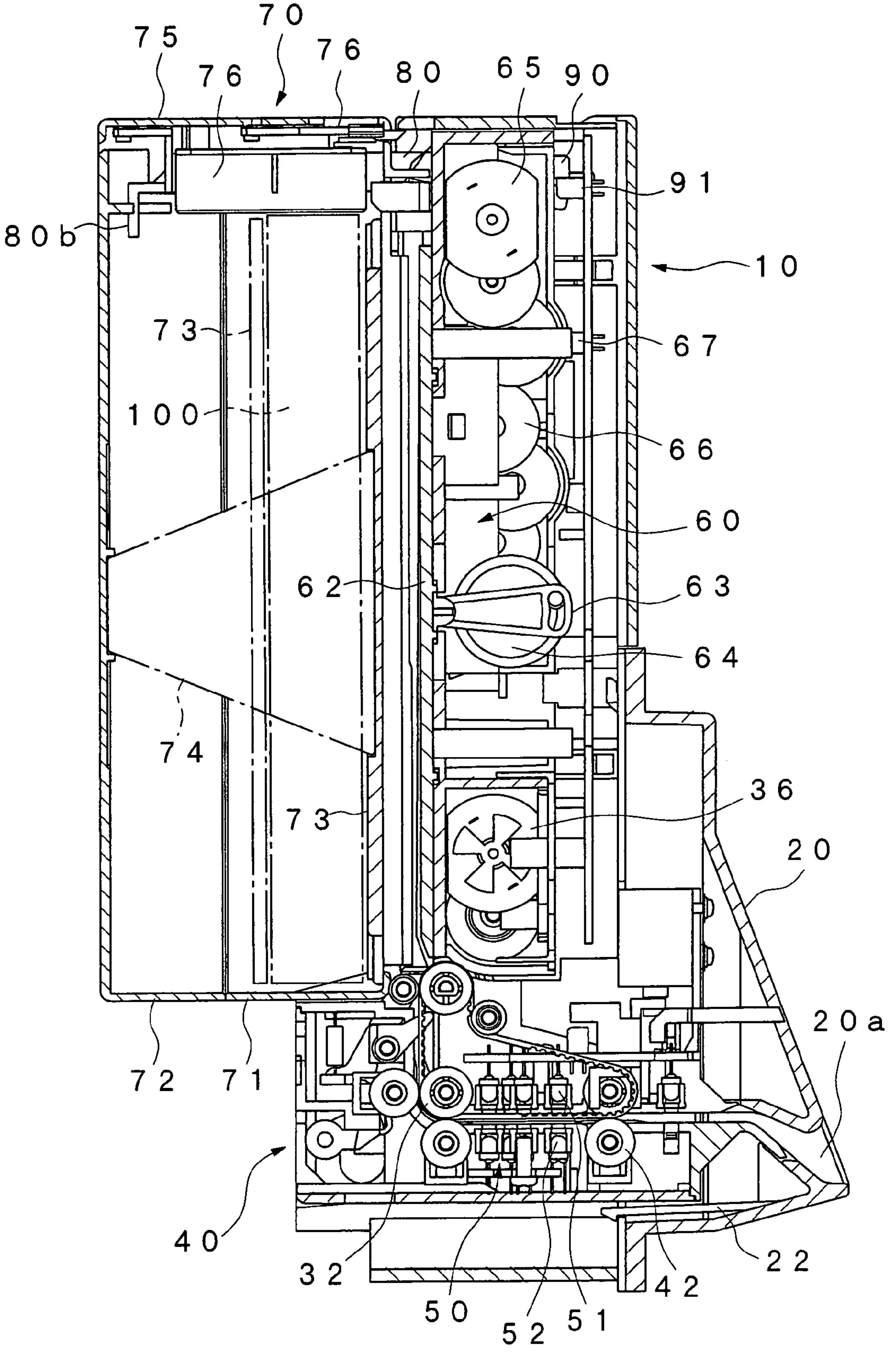
FIG. 2 shows a sideway unit of the paper money discriminating device.
Figure 3:
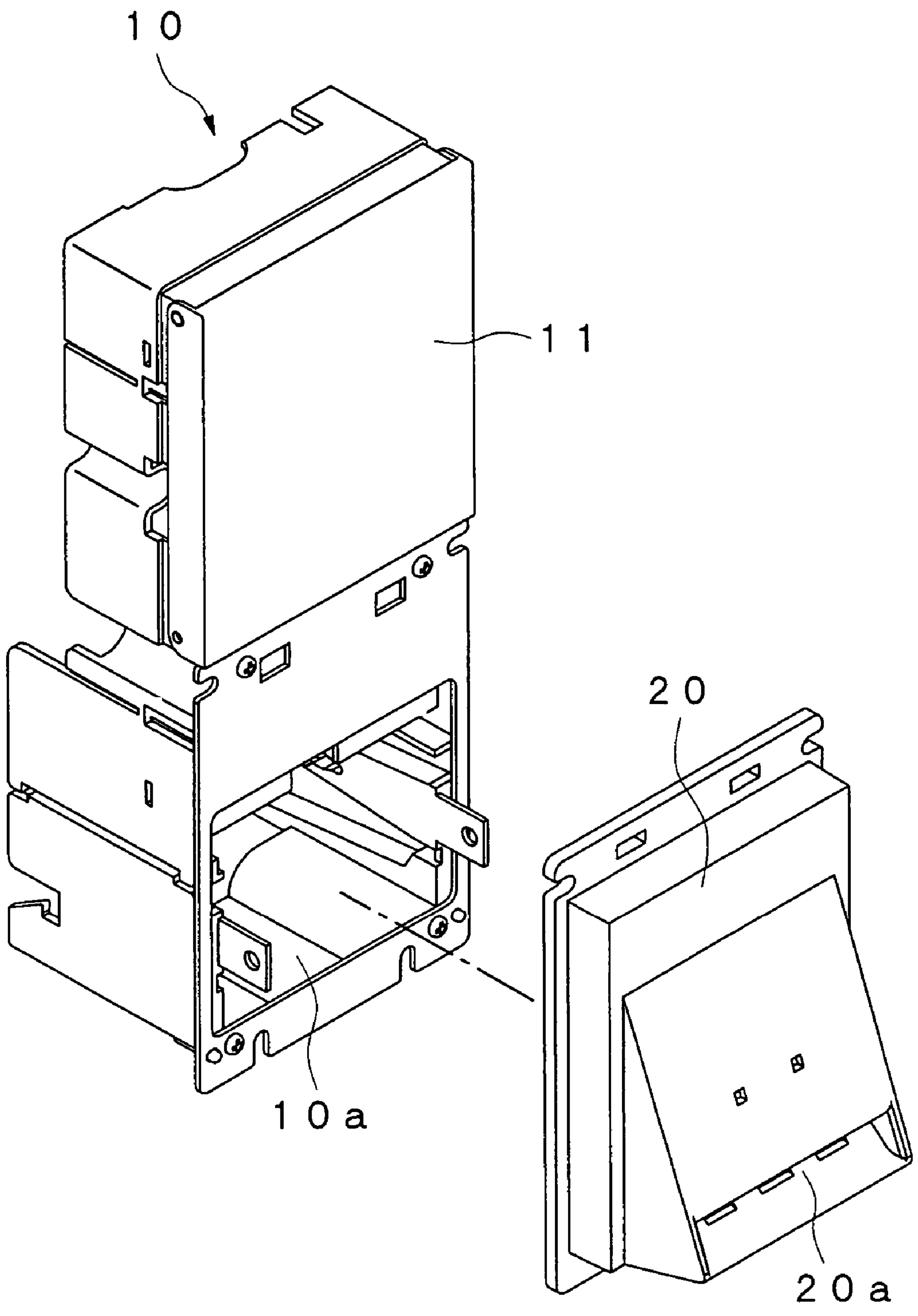
FIG. 3 shows an exploded perspective view from the front of a body case and inlet cover.
Figure 4:
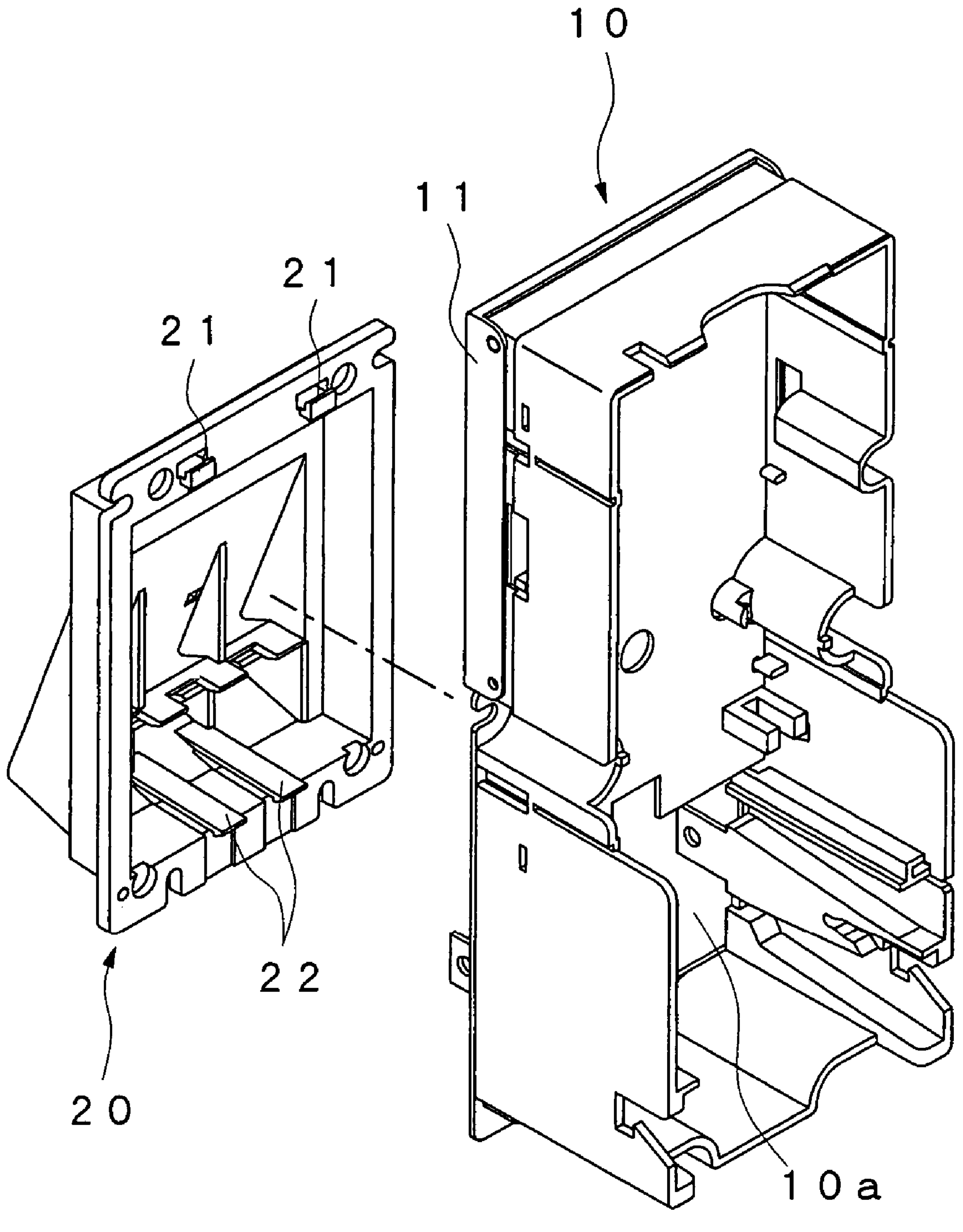
FIG. 4 shows an exploded perspective view from the back of the body case and the inlet cover.
Figure 5:
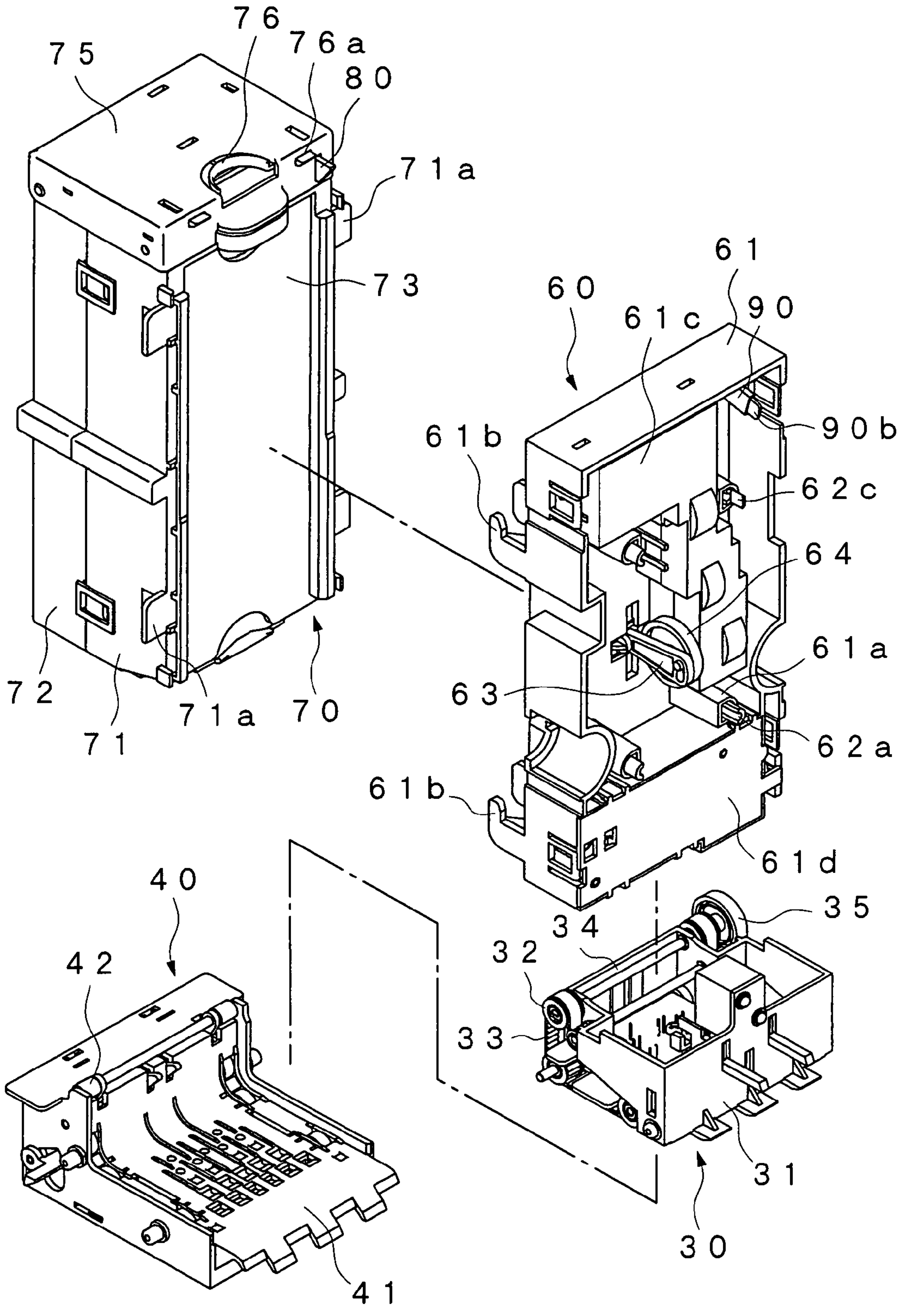
FIG. 5 shows an exploded perspective view from the front of the body case, a carrying unit and a pushing unit.
Figure 6:
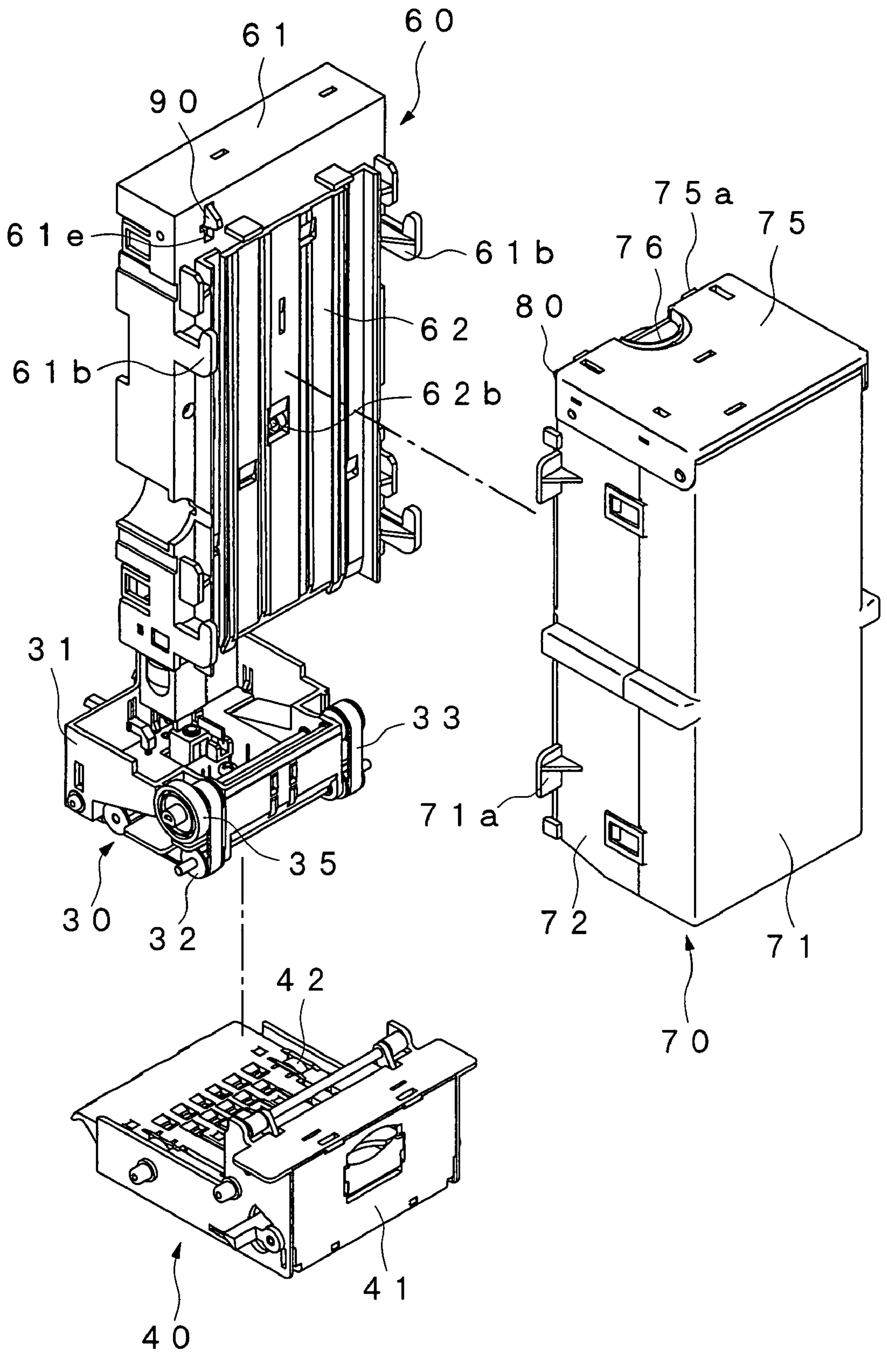
FIG. 6 shows an exploded perspective view from the back of the body case, the carrying unit and the pushing unit.
Figure 7:
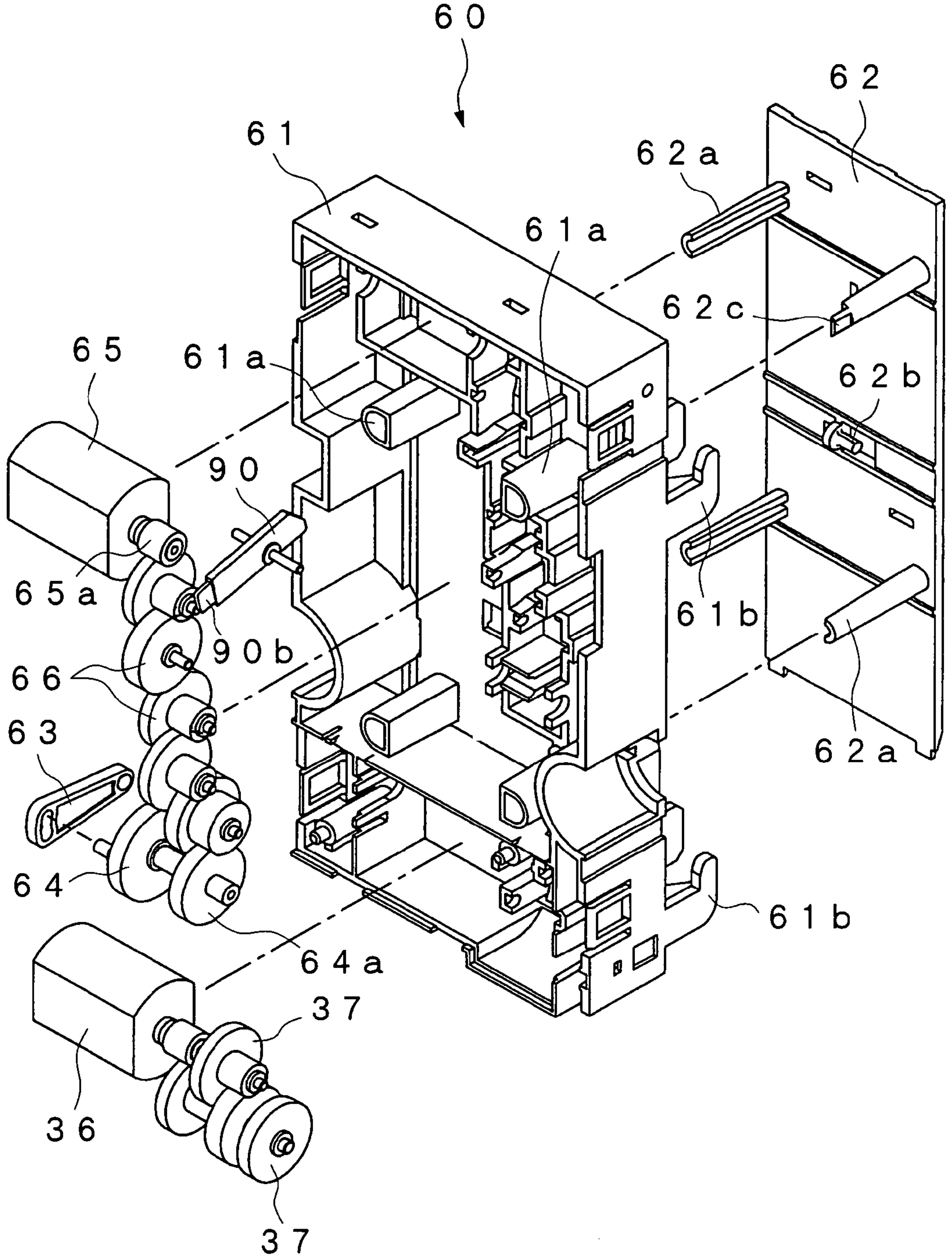
FIG. 7 shows an exploded perspective view of the pushing unit.
Figure 8:
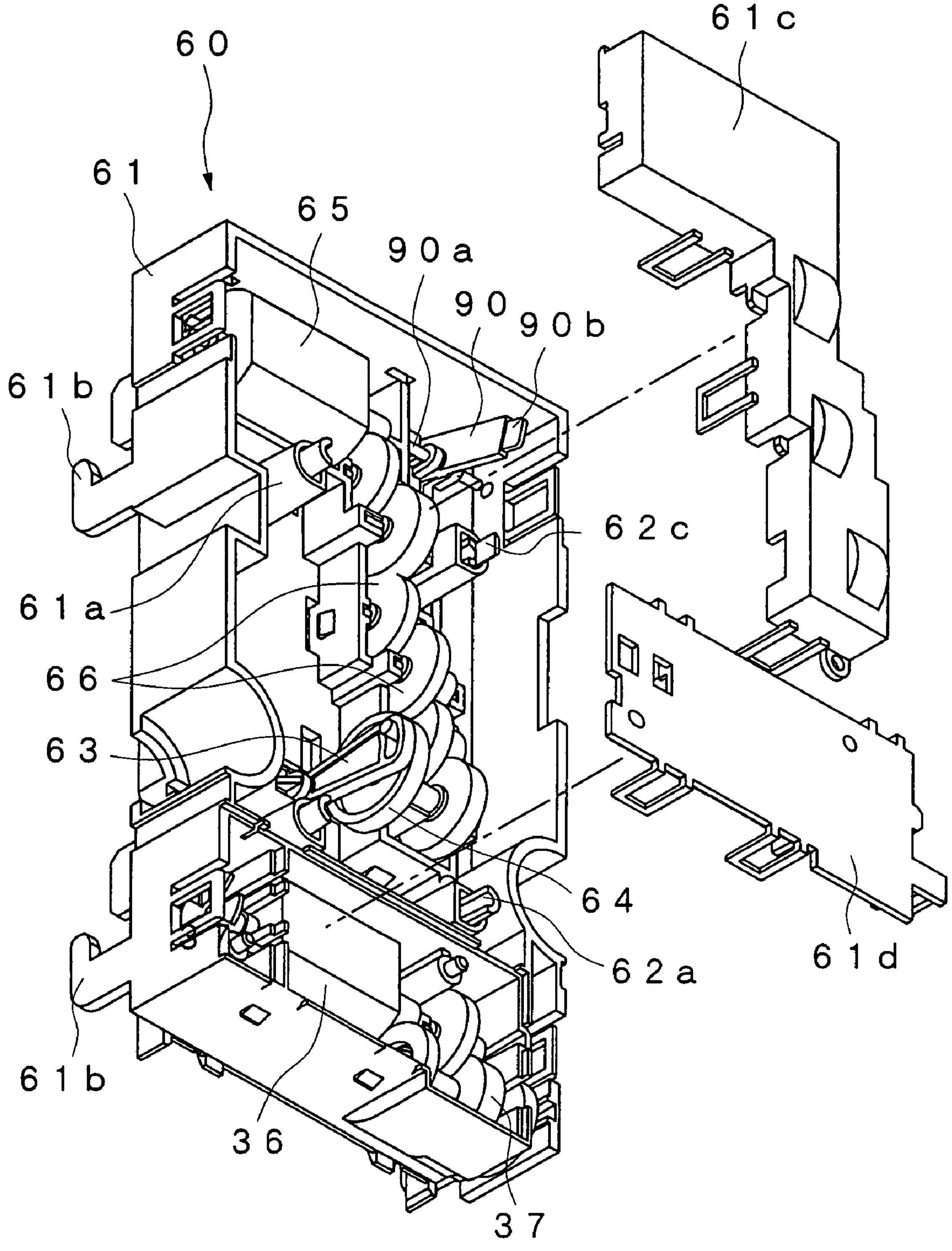
FIG. 8 shows an exploded perspective view of the pushing unit.
Figure 9:
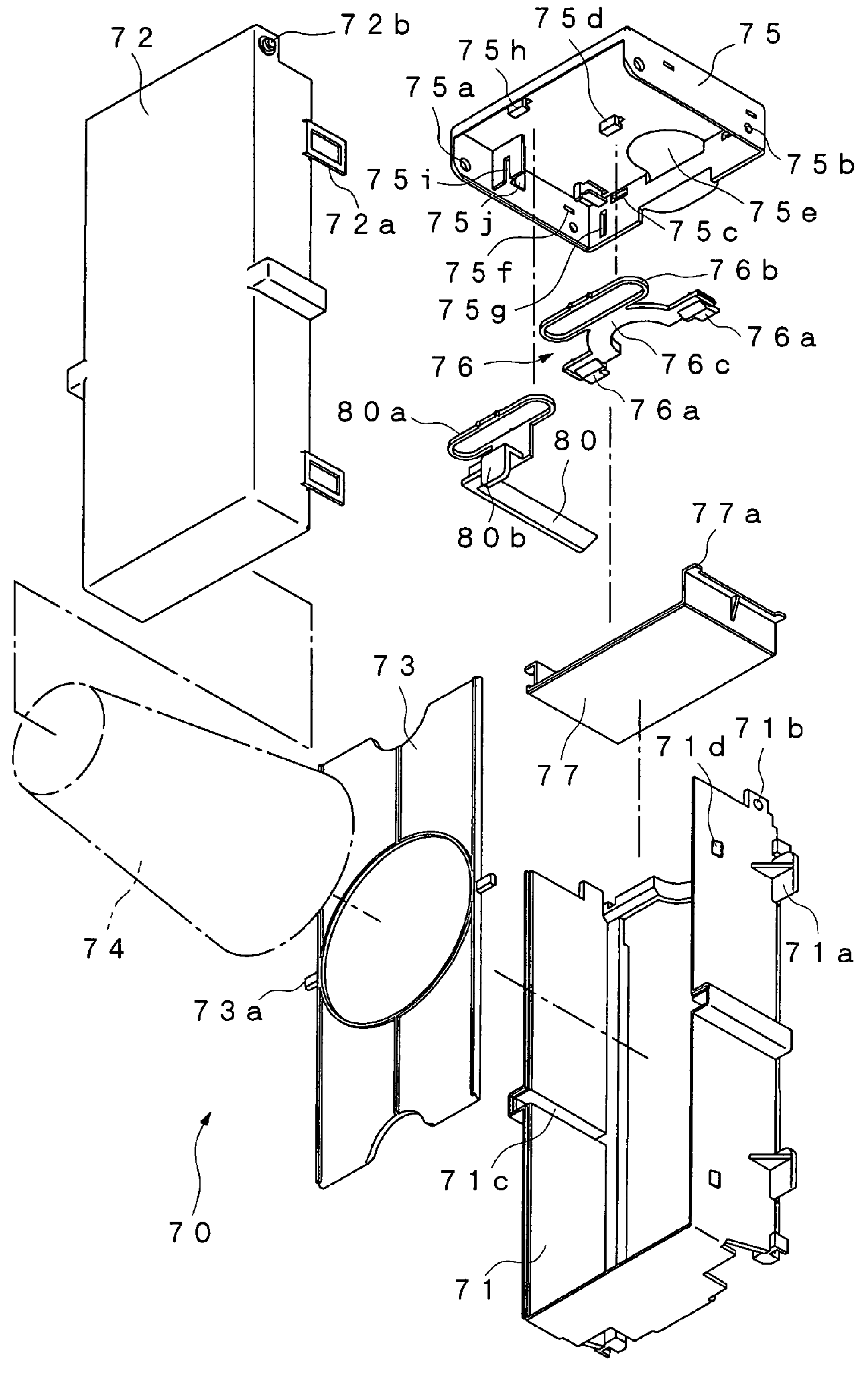
FIG. 9 shows an exploded perspective view of a paper money accommodating unit.
Figure 10:
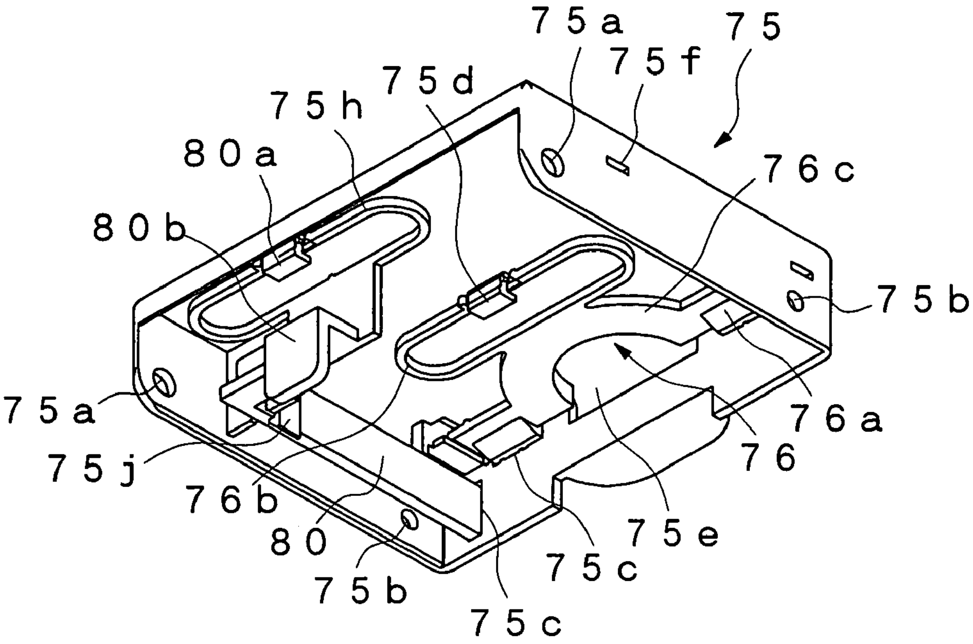
FIG. 10 shows a perspective view from the bottom of an openable cover.
Figure 11:
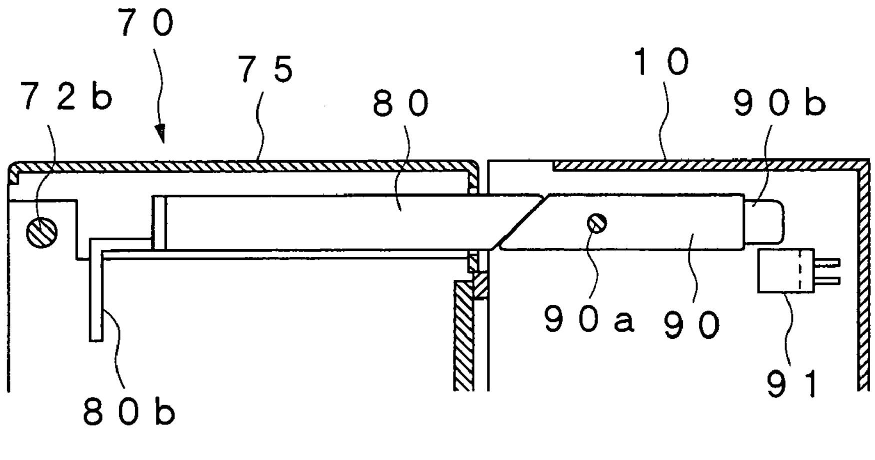
FIG. 11 shows a sideway unit of the essential parts of the paper money accommodating unit and the body unit.
Figure 12A:
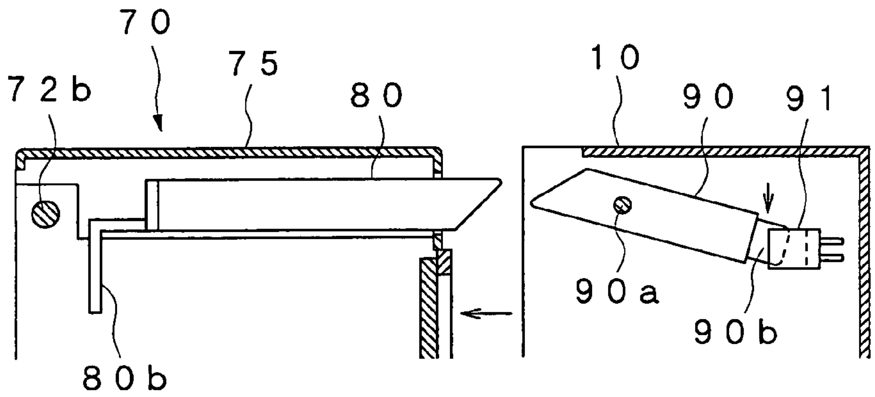
FIG. 12A, FIG. 12B and FIG. 12C illustrate how first and second detecting members operate.
Figure 12B:
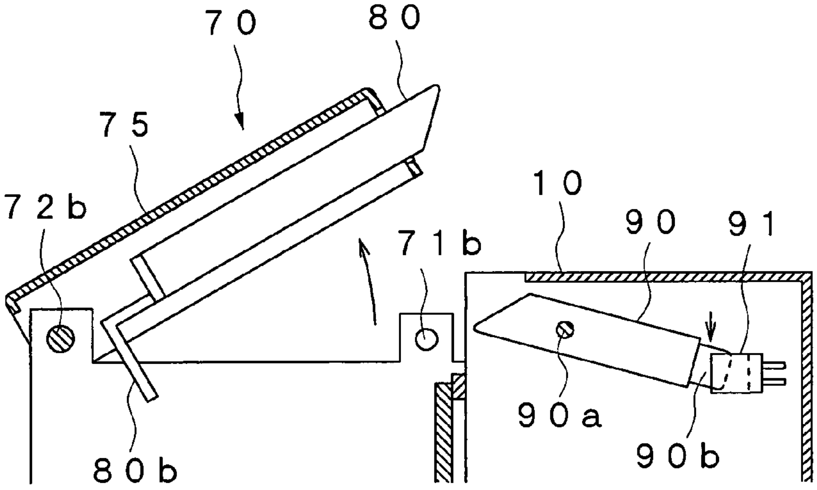
Figure 12C:
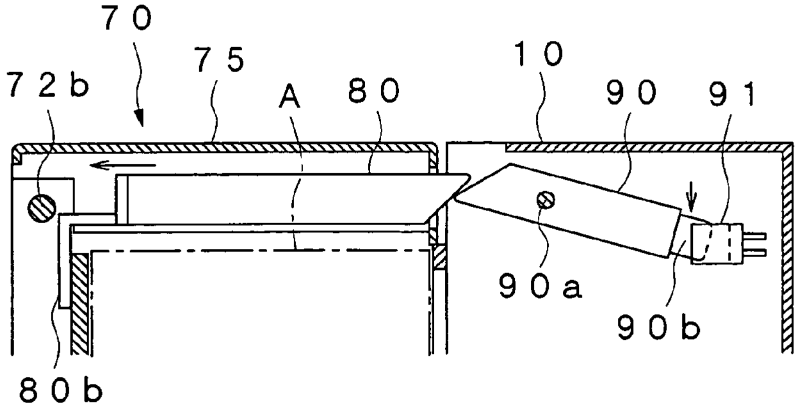
Figure 13A:
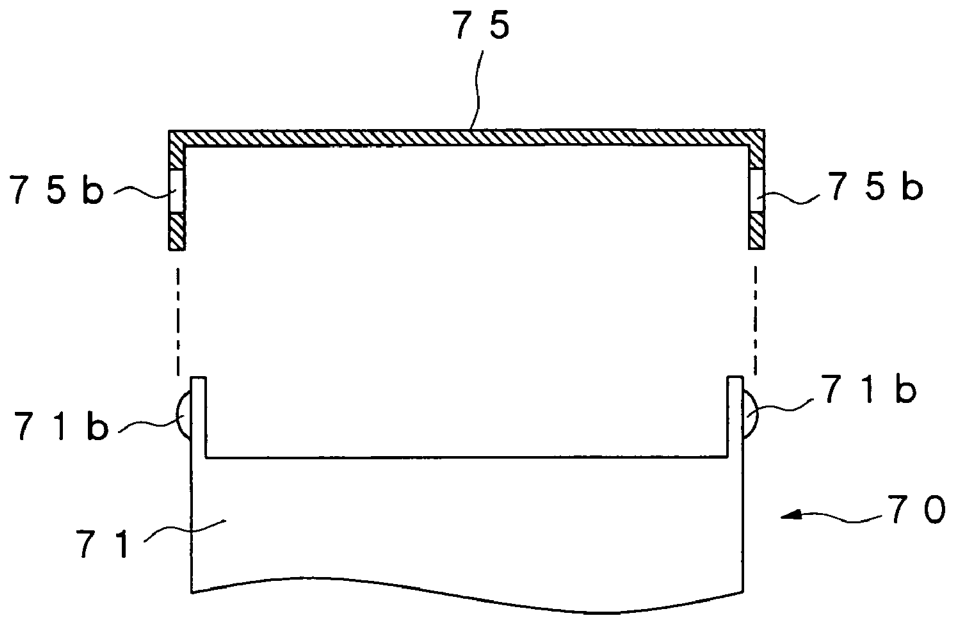
FIG. 13A and FIG. 13B show partial unital views from the front of the upper part of the openable cover and the paper money accommodating unit.
Figure 13B:
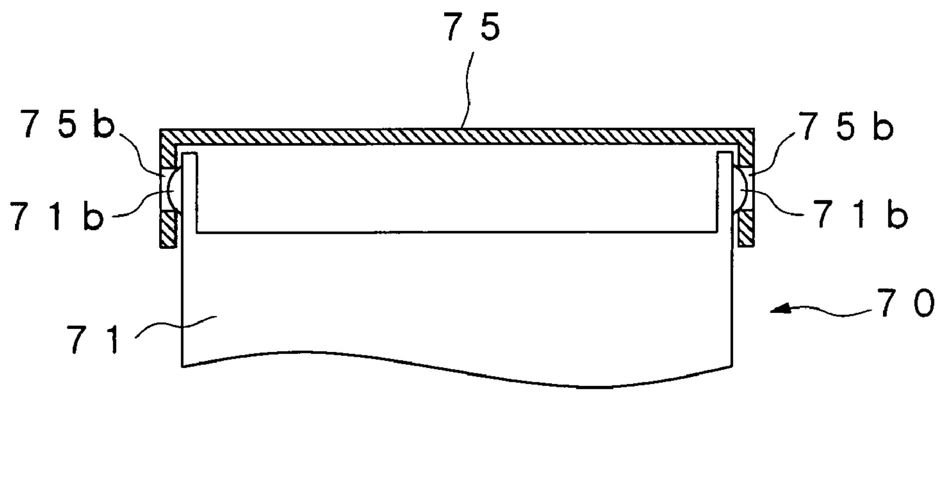

FIG. 1 through FIG. 14 illustrate a preferred embodiment of the present invention.

This paper money discriminating device is configured of a body case 10 constituting the body of the discriminating device, an inlet cover 20 through which paper money is to be put in, first and second carrying units 30 and 40 constituting mechanisms for carrying the input paper money, a discriminating unit 50 for discriminating the input paper money, a pushing unit 60 constituting a pushing mechanism for pushing backward the paper money carried by the first and second carrying units 30 and 40 to a prescribed position, a paper money accommodating unit 70 for accommodating the paper money pushed by the pushing unit 60, a first detecting member 80 arranged on the paper money accommodating unit 70 side, and a second detecting member 90 arranged on the body case 10 side.

The body case 10 is formed in a box shape open on the back side, and in the lower part of its front face is provided an opening 10*a* covered by the inlet cover 20. In the upper part of the front face of the body case 10 is provided an openable cover 11 for use in maintenance work.

The inlet cover 20 has a paper money inlet 20*a* toward the lower end of its front face and engaging portions 21 and 22 in the upper and lower parts, respectively, of its back side, which can be engaged with the body case 10 to detachably fit the cover to the lower part of the front face of the body case 10.

The first carrying unit 30 consists of a unit body 31 arranged above the second carrying unit 40, a plurality of guide rollers 32 turnably fitted to the unit body 31, and endless belts 33 threaded round the guide rollers 32. The guide rollers 32 and the belts 33 are provided on both ends of the unit body 31. The guide rollers 32 are arranged toward the back and bottom sides of the unit body 31, and are caused by the belts 33 to turn interlocked with one another. The guide rollers 32 arranged in the upper part of the back side of the unit body 31 are linked to one another by a shaft 34, and one of them is fitted with a gear 35. Thus the guide rollers 32 are turned by the rotational force inputted by way of the gear 35. In this arrangement, the first carrying unit 30 is driven by a motor 36 arranged on the pushing unit 60 side, and the rotational force of the motor 36 is transmitted to the gear 35 of the first carrying unit 30 via a gear 37 arranged on the pushing unit 60 side.

The second carrying unit 40 consists of a unit body 41 arranged underneath the first carrying unit 30 and a plurality of guide rollers 42 turnably fitted to the unit body 41, and the guide rollers 42 are provided on both ends of the unit body 41. The unit body 41 is formed to have a substantially L-shaped profile, and its arrangement opposite the back and bottom sides of the unit body 31 of the first carrying unit 30 results in the formation of a paper money carrying path extending in the back-and-forth and up-and-down directions between the unit body 41 and the unit body 31.

The discriminating unit 50 consists of a plurality of light emitting elements 51 disposed on the second carrying unit 40 side and a plurality of light receiving elements 52 disposed on the first carrying unit 30 side, and the light emitting elements 51 and the light receiving elements 52 are arranged to be opposite each other pair by pair with the paper money carrying path between them.

The pushing unit 60 is configured of a unit body 61 arranged within the body case 10, a pushing plate 62 for pushing paper money, a linking member 63 of which one end is turnably linked to the pushing plate 62, a rotating plate 64 to which the other end of the linking member 63 is turnably linked, a motor 65 for rotating the rotating plate 64, a plurality of gears 66 for transmitting the turning force of the motor 65 to the rotating plate 64, and a detector 67 for detecting the position of the pushing plate 62.

The unit body 61 accommodates within it the linking member 63, the motor 65 and the gears 66, and in its lower part the motor 36 for driving the first carrying unit 30 and the gear 37. In the upper and lower parts of the unit body 61 are disposed, in two positions in the widthwise direction, engaging cylinders 61*a* for engaging the pushing plate 62 to be slidable in the back-and-forth direction. The engaging cylinders 61*a* are formed integrally with the unit body case 61 to be extensible in the back-and-forth direction. On the back side of the unit body 61 are disposed in two positions, upper and lower, at the both ends in the widthwise direction, a plurality of engaging pieces 61*b* for engaging the paper money accommodating unit 70 with the body case 10. Each of the engaging pieces 61*b* protrude backward, and its tip is bent upward. Within the unit body 61 are fitted a cover 61*c* for shielding the drive mechanism (the motor 65, the gears 66 and so forth) of the pushing plate 62 and a cover 61*d* for shielding the drive mechanism (comprising the motor 36, the gear 37 and so forth) of the first carrying unit 30.

On the front side of the pushing plate 62 are disposed a plurality of engaging shafts 62*a* to engage with the engaging cylinders 61*a* of the unit body 61, and the engaging shafts 62*a* are formed integrally with the pushing plate 62 to be extensible in the back-and-forth direction toward the unit body 61. Thus, the engaging shafts 62*a* are inserted into the engaging cylinders 61*a* to be slidable in the back-and-forth direction, and the pushing plate 62 moves in the back-and-forth direction while being guided by the engaging cylinders 61*a*. In the central part of the pushing plate 62 is disposed a linking shaft 62*b* to which the linking member 63 is to be linked.

Of the linking member 63, one end is turnably linked to the linking shaft 62*b* of the pushing plate 62 and the other end has a slit 63*a* to which the rotating plate 64 is to be linked.

The rotating plate 64 is turnably fitted to the unit body case 61, and a gear 64*a* is provided integrally with the rotation shaft of the plate. A linking portion 64*b* to be linked to the linking member 63 protrudes in a position off the center of rotation of the rotating plate 64, and this linking portion 64*b* is inserted into the slit 63*a* of the linking member 63. In this arrangement, the slit 63*a* is so bored as to extend in the turning direction of the rotating plate 64, and the linking portion 64*b* can move within the slit 63*a* only by a distance L.

The motor 65 is arranged in the upper part of the unit body 61, and a gear 65*a* is fitted to its rotation shaft.

Each of the gears 66 is turnably supported by the unit body case 61, and consists of a known gear configuration in which toothed wheels, large and small, are coaxially formed. In this configuration, the gears 66, the gear 64*a* of the rotating plate 64 and the gear 65*a* of the motor 65 consist of spur gears, and can be turned by any of the turning forces inputted from the motor 65 side and the rotating plate 64 side.

The detector 67, disposed within the body case 10, detects a detection object 62*c* provided at the tip of a prescribed one of the engaging shafts 62*a* of the pushing plate 62 when the pushing plate 62 is in a standby position. In this arrangement, the detector 67 is so configured as to detect the detection object 62*c* without contacting it with, for instance, an optical sensor.

The paper money accommodating unit 70 consists of a box-shaped unit body 71 whose front, back and top faces are open, a unit cover 72 shielding the back face of the unit body 71, a paper money holding plate 73 disposed within the unit body 71 to be shiftable in the back-and-forth direction, a spring 74 for pushing the paper money holding plate 73 toward the front face of the unit body 71, an openable cover 75 for opening and closing an opening in the top face of the unit body 71, a locking member 76 for locking the openable cover 75 in a closed state and the paper money accommodating unit 70 fitted to the body case 10, and a paper money engaging plate 77 to be engaged with the upper end of paper money in the unit body 71.

On the front face side of the unit body 71 are disposed a plurality of engaging portions 71*a* to engage the engaging pieces 61*b* of the pushing unit 60 in two positions, upper and lower, at the both ends in the widthwise direction, and each of the engaging portions 71*a* is formed in a plate shape extending in the widthwise direction. At the upper end of the front face side of the unit body 71 on each flank in the widthwise direction is provided with a projection 71*b* to engage with the openable cover 75, and each of the projections 71*b* is shaped in a hemisphere protruding toward the outside of the unit body 71. In the inner flanks of the unit body 71, grooves 71*c* are cut to engage the paper money holding plate 73 to be shiftable in the back-and-forth direction.

The unit cover 72 has a plurality of engaging portions 72*a* to engage with a plurality of projections 71*d* disposed on the two sides of the unit body 71, and is fitted to the unit body 71 by the engagement of the engaging portions 72*a* and the projections 71*d*. At the upper end of the both ends of the unit cover 72 in the widthwise direction are provided with linking portions 72*b* to link the openable cover 75 turnably, and these linking portions 72*b* are so formed as to protrude outside the unit cover 72.

The paper money holding plate 73 is formed in a plate shape slightly smaller than the inner dimensions of the unit body 71, and is so arranged as to match the pushing plate 62 of the pushing unit 60. At the both ends of the paper money holding plate 73 in the widthwise direction are disposed exsert portions 73*a* to engage with the grooves 71*c* of the unit body 71, and the paper money holding plate 73 move in the back-and-forth direction while being guided by the grooves 71*c*.

The spring 74, simplified in illustration, is a coil spring, and intervenes between the paper money holding plate 73 and the unit cover 72 in a compressed state. In this configuration, the spring 74 is so formed as to gradually increase in winding diameter from the unit cover 72 toward the paper money holding plate 73.

The openable cover 75 is so formed as to shield the upper end side of the unit body 71 and the unit cover 72, and toward the rear end of its two flanks in the widthwise direction are bored holes 75*a* with which the linking portions 72*b* of the unit cover 72 are to turnably engage. At the front end of the two flanks of the openable cover 75 in the widthwise direction are bored holes 75*b* with which the projections 71*b* of the unit body 71 are to engage.

The locking member 76 has toward the front end of its two flanks in the widthwise direction engaging portions 76*a* which protrude forward. The engaging portions 76*a* protrude outside the openable cover 75 through a pair of holes 75*c* in the widthwise direction, bored in the front face of the openable cover 75. Toward the rear end of the locking member 76 is disposed an elastically deformable annular movable portion 76*b* which is elastically deformable in the back-and-forth direction and, by engaging the rear end of the movable portion 76*b* with an engaging portion 75*d* provided on the inner face of the openable cover 75, the locking member 76 is fitted inside the openable cover 75. Between the engaging portions 76*a* is disposed an arciform manipulative portion 76*c*. When the manipulative portion 76*c* is manipulated to be pushed backward, the movable portion 76*b* is elastically deformed to shift the engaging portions 76*a* backward. In this arrangement, the manipulative portion 76*c* can be manipulated from outside through a semicircular hole 75*e* bored in the inner face of the openable cover 75.

The paper money engaging plate 77, whose bottom face is formed in a plane slightly smaller than the inner dimensions of the openable cover 75, is fitted to the openable cover 75 by engaging projections 77*a* disposed toward the upper end of its two flanks in the widthwise direction with holes 75*f* bored in the two flanks of the openable cover 75 from inside the openable cover 75.

The first detecting member 80, consisting of a plate-shaped member extending in the back-and-forth direction, is arranged on the openable cover 75 of the paper money accommodating unit 70. The front end of the first detecting member 80 protrudes outside the openable cover 75 through a hole 75*g* bored in the front face of the openable cover 75, and its end face is so formed as to look down obliquely. Toward the rear end of the first detecting member 80 is disposed an annular movable portion 80*a* elastically deformable in the back-and-forth direction, and the first detecting member 80 is fitted inside the openable cover 75 by engaging the rear end of the movable portion 80*a* with an engaging portion 75*h* provided on the inner face of the openable cover 75. Further the portion of the first detecting member 80, extensible in the back-and-forth direction, is engaged with a groove 75*i* in the openable cover 75, and at its bottom end is engaged with an engaging pawl 75*j* of the openable cover 75. The first detecting member 80 further has an engaging portion 80*b* for engaging the paper money holding plate 73. The engaging portion 80*b* extends downward from the rear end of the first detecting member 80 so as to engage with the paper money holding plate 73 having shifted toward the rear part within the paper money accommodating unit 70. Thus, when the paper money holding plate 73 engages with the engaging portion 80*b* of the first detecting member 80 and the engaging portion 80*b* is pushed backward by the paper money holding plate 73, the movable portion 80*a* is elastically deformed to cause the first detecting member 80 to shift backward.

The second detecting member 90, consisting of a plate-shaped member extensible in the back-and-forth direction, is disposed in the unit body 61 of the pushing unit 60. The rear end of the second detecting member 90 protrudes outside the pushing unit 60 through a hole 61*e* bored in the back face of the unit body 61, and its end face is so formed as to look up obliquely. The second detecting member 90 has a spindle 90*a* extending in the widthwise direction, and is turnably fitted to the unit body 61 via the spindle 90*a*. In this configuration, the spindle 90*a* is positioned toward the rear end of the second detecting member 90, and the second detecting member 90 so turns that its front end part falls by its own weight. Further, a detector 91 for detecting the position of the second detecting member 90 is disposed within the body case 10. The detector 91 detects a detection object 90*b* provided at the front end of the second detecting member 90 when the front end part of the second detecting member 90 is in a downward position. In this arrangement, the detector 91 is so configured as to detect the detection object 90*b* without contacting it by using, for instance, an optical sensor.

In the paper money discriminating device configured as described above, when paper money is put into the paper money inlet 20*a* of the inlet cover 20, the motor 36 of the first carrying unit 30 is actuated, and the guide rollers 32 and 42 of the first and second carrying units 30 and 40, respectively, and the belts 33 carry the paper money to between the pushing unit 60 and the paper money accommodating unit

70. In this process, the passage of the carried paper money between the light emitting elements 51 and the light receiving elements 52 of the discriminating unit 50 causes the discriminating unit 50 to determine whether or not the paper money is genuine or false and its face value. When paper money is carried between the pushing unit 60 and the paper money accommodating unit 70, the motor 65 of the pushing unit 60 is actuated, and the pushing plate 62 shifts toward the paper money accommodating unit 70. This causes the paper money to be pushed by the pushing plate 62 toward the paper money accommodating unit 70 and to be brought into the paper money accommodating unit 70. In this process, the pushing plate 62 shifts the paper money holding plate 73, together with the paper money, backward against the spring 74 and, when the pushing plate 62 returns to its standby position, the paper money holding plate 73, together with the paper money, is also returned forward by the spring 74.

Figure 14A:
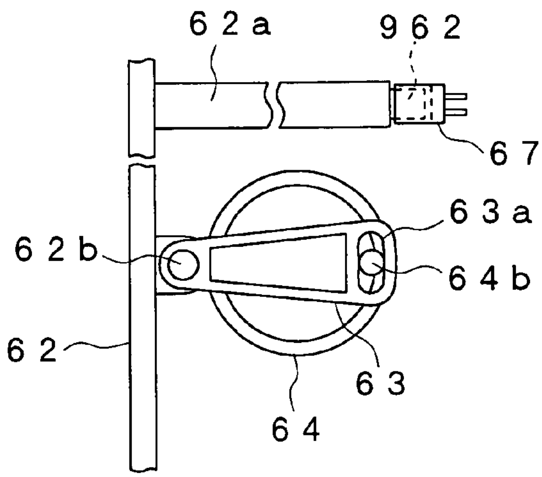
FIG. 14A, FIG. 14B and FIG. 14C illustrate how the pushing plate operates.
Figure 14B:
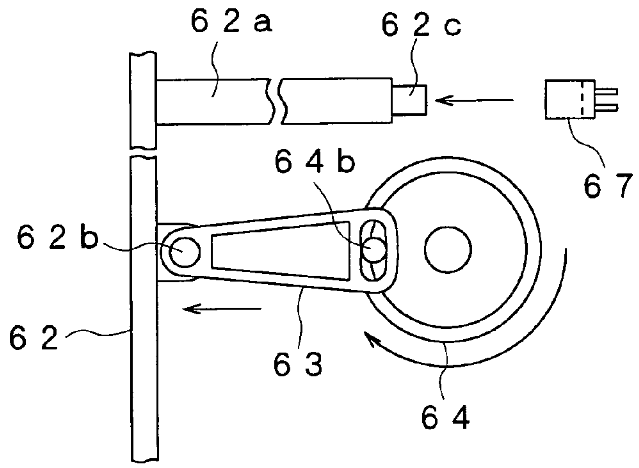

In pushing the paper money with the pushing plate 62, when the motor 65 of the pushing unit 60 turns, its turning force is transmitted to the rotating plate 64 via the gears 66, and the rotating plate 64 is turned in the prescribed direction. This causes the rotation of the rotating plate 64 to be converted by the linking member 63 into the reciprocation of the pushing plate 62 as shown in FIG. 14A and FIG. 14B. In this process, each of the engaging shafts 62*a* of the pushing plate 62 slides back and forth within each of the engaging cylinders 61*a* of the unit body case 61 to cause the pushing plate 62, guided by the engaging cylinders 61*a*, to shift back and forth while holding the state of being parallel to the paper money holding plate 73. When the pushing plate 62 returns to its standby position, the detection object 62*c* of the pushing plate 62 is detected by the detector 67, and the motor 65 stops.

In the paper money discriminating device described above, upon fitting of the paper money accommodating unit 70 to the body case 10, the openable cover 75 is closed and, when no more paper money A is within the paper money accommodating unit 70 than its prescribed paper money capacity, the front end of the first detecting member 80 comes into contact with the rear end of the second detecting member 90, causing the detection object 90*b* of the second detecting member 90 to be held in an elevated state. This makes it impossible for the detection object 90*b* to be detected by the detector 91, and this state is judged to be an operable state for the paper money discriminating device. Hereupon, if the paper money accommodating unit 70 is removed from the body case 10, the openable cover 75 is opened or paper money 100 in the paper money accommodating unit 70 surpasses its prescribed paper money capacity (the unit 70 is filled), and the first detecting member 80 is shifted backward by the paper money holding plate 73, the second detecting member 90 and the first detecting member 80 will be released from contact with each other in any of these cases, with the result that the turning of the second detecting member 90 shifts the detection object 90*b* downward to enable the detection object 90*b* to be detected by the detector 91. This causes the paper money discriminating device to be judged to be in an inoperable state.

In this way, according to the paper money discriminating device, which is the preferred embodiment of the invention, the detector 91, one of the detectors, can detect the action of the second detecting member 90 turned by the contact of the first detecting member 80, any of the states in which the paper money accommodating unit 70 is removed from the body case 10, the openable cover 75 is opened or paper money 100 in the paper money accommodating unit 70 surpasses its prescribed paper money capacity. Accordingly, the number of constituent elements can be substantially reduced compared with a device using a plurality of detectors, with the result that the device can be simplified in structure and manufactured less expensively and therefore can contribute to cost reduction and productivity improvement.

To add, although in this embodiment, the single detector 91 can detect any of the states in which the paper money accommodating unit 70 is taken off, the openable cover 75 is opened or paper money A is beyond the prescribed capacity of the accommodating unit 70, it is also possible to have the detector 91 only the removal of the paper money accommodating unit 70 or the open state of the openable cover 75, or only the removal of the paper money accommodating unit 70 or the presence of paper money A beyond the prescribed capacity of the accommodating unit 70.

Further in the paper money discriminating device, when the openable cover 75 is closed, the engaging portions 76*a* of the locking member 76 are engaged with the under face of the top face of the body case 10, and the openable cover 75 is locked. When the openable cover 75 is to be opened, by manipulating the manipulative portion 76*c* of the locking member 76 to be pushed backward, the engaging portions 76*a* are shifted toward the openable cover 75 to come off the top wall of the body case 10 and to unlock the openable cover 75.

When the paper money accommodating unit 70 is to be fitted to the body case 10, by engaging from above the engaging portions 71*a* of the paper money accommodating unit 70 with the engaging pieces 61*b* of the pushing unit 60, the paper money accommodating unit 70 is caused to be held on the body case 10 side. In this process, the engaging portions 76*a* of the locking member 76 of the closed openable cover 75 engage with the top face wall of the body case 10 from underneath, thereby to restrain the upward shift of the paper money accommodating unit 70 and to lock the paper money accommodating unit 70. When the paper money accommodating unit 70 is to be removed from the body case 10 side, by pushing backward the manipulative portion 76*c* of the locking member 76, the engaging portions 76*a* are shifted toward the openable cover 75 to let the unit 70 come off the top face wall of the body case 10 as described above, the paper money accommodating unit 70 is unlocked. By pulling upward the paper money accommodating unit 70 in this state, the paper money accommodating unit 70 is taken off the body case 10.

As described above, by engaging the engaging portions 76*a* of the locking member 76 with the under face of the top face wall of the body case 10, both the openable cover 75 and the paper money accommodating unit 70 can be locked with the single locking member 76. Accordingly, the number of constituent elements can be substantially reduced compared with a device in which the openable cover 75 and the paper money accommodating unit 70 are locked by a plurality of locking mechanisms, with further advantages in cost reduction and productivity improvement. Furthermore, as the locking member 76 can securely lock both the openable cover 75 and the paper money accommodating unit 70, this arrangement can effectively contribute to the protection of paper money from theft.

In a state in which the paper money accommodating unit 70 is taken off, the openable cover 75 is also released from locking by the locking member 76, but where the openable cover 75 is closed, the projections 71*b* of the unit body 71 engage with the holes 75*b* of the openable cover 75, and the engagement between the projections 71*b* and the holes 75*b* holds the openable cover 75 in its closed state. At this time, if a force of or greater than a prescribed magnitude is applied in the opening direction of the openable cover 75, the projections 71*b* and the holes 75*b* will be disengaged from each other.

Therefore, even in a state in which the paper money accommodating unit 70 is taken off, as the openable cover 75 can be held in its closed state, there is an advantage that the openable cover 75 cannot be accidentally opened. Incidentally, while the openable cover 75 is held by mutual engagement of the projections 71*b* and the holes 75*b* in this embodiment, the openable cover 75 can as well be held by using attracting members such as magnets.

Further, as the openable cover 75 is provided with the paper money engaging plate 77 which can be engaged with the upper end of paper money, the sheets of paper money are prevented from becoming misaligned in the vertical direction, but can be accommodated neatly within the paper money accommodating unit 70.

In addition, in the paper money discriminating device, which is the preferred embodiment of the invention, the pushing plate 62 integrated with the plurality of engaging shafts 62*a* are engaged to be slidable in the back-and-forth direction with the engaging cylinders 61*a* integrated with the unit body case 61, the sliding mechanism of the pushing plate 62 can be configured solely of the engaging shafts 62*a* and the engaging cylinders 61*a*. Accordingly, the number of constituent elements can be substantially reduced compared with a device in which a sliding member or a pantagraph mechanism is used as a separate component.

In this configuration, by linking one end of the linking member 63 to the pushing plate 62 and the other end of the linking member 63 to the rotating plate 64 in a position off the center of rotation, the pushing plate 62 is enabled to reciprocate by the rotary motion of the rotating plate 64. Therefore, the driving force of the rotating plate 64 can be efficiently transmitted to the pushing plate 62, and the pushing plate 62 can be operated satisfactorily all the time.

In the above-described paper money discriminating device, when the pushing plate 62 returns to its standby position, the detection object 62*c* of the pushing plate 62 is detected by the detector 67, and the motor 65 is stopped then. Accordingly, it is made possible to securely stop the pushing plate 62 in its prescribed standby position, and the operation of the pushing plate 62 can be properly controlled all the time.

Figure 14C:
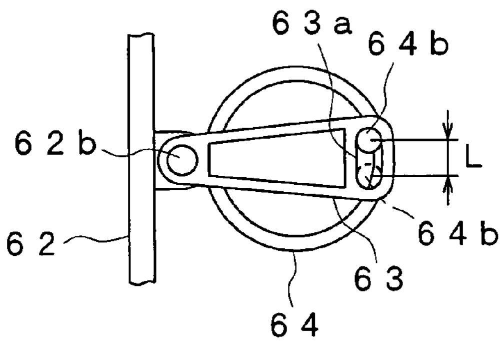

In this process, as shown in FIG. 14C, as the linking portion 64*b* of the linking member 63 can shift within the slit 63*a* of the rotating plate 64 only by the distance L, even if the linking portion 64*b* is somewhat off its due position when the motor 65 has stopped, the pushing plate 62 always stops in the prescribed position in the back-and-forth direction. Thus, as the slit 63*a* extends in the turning direction of the rotating plate 64, the distance to the linking shaft 62*b* remains unchanged even if the linking portion 64*b* shifts if its within the distance L, and the pushing plate 62 is not shifted in the back-and-forth direction. Therefore, the pushing plate 62 can be stopped always in the accurate position, and defective carriage of paper money due to any positional deviation of the pushing plate 62 can be prevented without fail.

Further, the use of spur gears as the gears 64*a*, 65*a* and 66 has resulted in a configuration in which these gears can be turned by a turning force inputted from any side, whether it is from the motor 65 or from the rotating plate 64. Therefore, even if the motor 65 cannot work on account of the absence of power supply or failure of the motor 65 itself, the pushing plate 62 can be manually shifted, which is a significant advantage in maintenance or repair work.

Also in the above-described paper money discriminating device, the detectors 67 and 91 are so configured as to be able to detect the detection objects 62*c* and 90*b* without containing it, the device is less subject to troubles due to damages or the like than contact type switches, which means further enhancement of durability and reliability.

What is claimed is:

1. A paper money discriminating device comprising a discriminating unit for discriminating paper money put in through a paper money inlet, a carrying mechanism for carrying discriminated paper money to a prescribed position within a discriminating device body, and a paper money accommodating unit for accommodating the paper money carried to the prescribed position, wherein the paper money accommodating unit is disposed detachably from the discriminating device body and the paper money accommodating unit is provided with an openable member for opening and closing a paper money outlet, further provided with:

a first detecting member disposed toward said paper money accommodating unit to be opposite a prescribed position on the discriminating device body side and arranged integrated with the openable member, a second detecting member provided in a prescribed position on the discriminating device body side, which comes into contact with the first detecting member when the paper money accommodating unit is fitted to the discriminating device body and the openable member is in a closed state, is released from the contact with the first detecting member and performs a prescribed action when the paper money accommodating unit is taken off the discriminating device body or when the openable member is opened, and a detector for detecting the action of the second detecting member.

2. A paper money discriminating device comprising a discriminating unit for discriminating paper money put in through a paper money inlet, a carrying mechanism for carrying discriminated paper money to a prescribed position within a discriminating device body, and a paper money accommodating unit for accommodating the paper money carried to the prescribed position, wherein the paper money accommodating unit is disposed detachably from the discriminating device body and the paper money accommodating unit is provided with an openable member for opening and closing a paper money outlet, further provided with:

a first detecting member disposed toward said paper money accommodating unit to be opposite a prescribed position on the discriminating device body side and shifting in a prescribed direction according to the quantity of paper money accommodated in the paper money accommodating unit, a second detecting member provided in a prescribed position on the discriminating device body side, which comes into contact with the first detecting member when the paper money accommodating unit is fitted to the discriminating device body and paper money accommodated in the paper money accommodating unit is less than a prescribed quantity, is released from the contact with the first detecting member and performs a prescribed action when the paper money accommodating unit is taken off the discriminating device body or when paper money accommodated in the paper money accommodating unit has reached or surpassed the prescribed quantity, and a detector for detecting the action of the second detecting member.

3. A paper money discriminating device comprising a discriminating unit for discriminating paper money put in through a paper money inlet, a carrying mechanism for carrying discriminated paper money to a prescribed position within a discriminating device body, and a paper money accommodating unit for accommodating the paper money carried to the prescribed position, wherein the paper money accommodating unit is disposed detachably from the discriminating device body and the paper money accommodating unit is provided with an openable member for opening and closing a paper money outlet, further provided with:

a first detecting member disposed toward said paper money accommodating unit to be opposite a prescribed position on the discriminating device body side, arranged integrated with the openable member, and shifting in a prescribed direction according to the quantity of paper money accommodated in the paper money accommodating unit, a second detecting member provided in a prescribed position on the discriminating device body side, which comes into contact with the first detecting member when the paper money accommodating unit is fitted to the discriminating device body, the openable member is closed and paper money accommodated in the paper money accommodating unit is less than a prescribed quantity, is released from the contact with the first detecting member and performs a prescribed action when the paper money accommodating unit is taken off the discriminating device body, when the openable member is opened or when paper money accommodated in the paper money accommodating unit has reached or surpassed the prescribed quantity, and a detector for detecting the action of the second detecting member.

4. The paper money discriminating device according to claim 1, further provided with:

a locking member which is disposed on said openable member, and regulates the opening of the openable member and at the same time regulates the detachment of the paper money accommodating unit from the discriminating device body by engaging with a prescribed part of the discriminating device body.

5. The paper money discriminating device according to claim 1, further provided with:

a holding unit which can hold said openable member in a closed state and releases it from the closed when a force of or greater than a prescribed magnitude is applied in the opening direction.

6. The paper money discriminating device according to claim 1, further provided with:

a paper engaging member capable of being engaged with one end of paper money in the paper money accommodating unit inside said openable member.

7. The paper money discriminating device according to claim 1, wherein:

said detector is configured to be able to detect the object of detection without contacting it.

8. The paper money discriminating device according to claim 2, further provided with:

a locking member which is disposed on said openable member, and regulates the opening of the openable member and at the same time regulates the detachment of the paper money accommodating unit from the discriminating device body by engaging with a prescribed part of the discriminating device body.

9. The paper money discriminating device according to claim 3, further provided with:

a locking member which is disposed on said openable member, and regulates the opening of the openable member and at the same time regulates the detachment of the paper money accommodating unit from the discriminating device body by engaging with a prescribed part of the discriminating device body.

10. The paper money discriminating device according to claim 2, further provided with:

a holding unit which can hold said openable member in a closed state and releases it from the closed when a force of or greater than a prescribed magnitude is applied in the opening direction.

11. The paper money discriminating device according to claim 3, further provided with:

a holding unit which can hold said openable member in a closed state and releases it from the closed when a force of or greater than a prescribed magnitude is applied in the opening direction.

12. The paper money discriminating device according to claim 2, further provided with:

a paper engaging member capable of being engaged with one end of paper money in the paper money accommodating unit inside said openable member.

13. The paper money discriminating device according to claim 3, further provided with:

a paper engaging member capable of being engaged with one end of paper money in the paper money accommodating unit inside said openable member.

14. The paper money discriminating device according to claim 2, wherein:

said detector is configured to be able to detect the object of detection without contacting it.

15. The paper money discriminating device according to claim 3, wherein:

said detector is configured to be able to detect the object of detection without contacting it.

* * * * *